United States Patent
Sanvido et al.

(10) Patent No.: US 7,965,465 B2
(45) Date of Patent: Jun. 21, 2011

(54) TECHNIQUES FOR STORING SHINGLE BLOCKS IN A CACHE MEMORY USING A DATA STORAGE DEVICE

(75) Inventors: Marco Sanvido, Belmont, CA (US); Cyril Guyot, San Jose, CA (US); Anand Krishnamurthi Kulkarni, San Jose, CA (US); Zvonimir Bandic, San Jose, CA (US); Martin Chen, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 43 days.

(21) Appl. No.: 12/402,415

(22) Filed: Mar. 11, 2009

(65) Prior Publication Data

US 2010/0232057 A1  Sep. 16, 2010

(51) Int. Cl.
*G11B 19/04* (2006.01)
*G11B 5/09* (2006.01)

(52) U.S. Cl. .......................................... 360/60; 360/48

(58) Field of Classification Search ..................... None
See application file for complete search history.

(56) References Cited

U.S. PATENT DOCUMENTS

| | | | |
|---|---|---|---|
| 6,185,063 B1 | 2/2001 | Cameron | |
| 6,967,810 B2 | 11/2005 | Kasiraj et al. | |
| 7,483,228 B2 * | 1/2009 | Song et al. | 360/31 |
| 2006/0080501 A1 | 4/2006 | Auerbach et al. | |
| 2007/0236818 A1 * | 10/2007 | Emo et al. | 360/60 |
| 2008/0304172 A1 * | 12/2008 | Bi et al. | 360/48 |
| 2010/0091408 A1 | 4/2010 | Albrecht et al. | |

* cited by examiner

*Primary Examiner* — Andrew L Sniezek
(74) *Attorney, Agent, or Firm* — Steven J. Cahill

(57) ABSTRACT

A data storage apparatus includes a data storage medium, a write element, a non-volatile cache memory circuit, and a controller circuit. The controller circuit is configured to record data on the data storage medium in groups of overlapping tracks using the write element. The controller circuit is configured to store a shingle block of data from a subset of the overlapping tracks in the non-volatile cache memory circuit, while at least a portion of the data in the shingle block of data is updated.

16 Claims, 4 Drawing Sheets

TECHNIQUES FOR STORING SHINGLE BLOCKS IN A CACHE MEMORY USING A DATA STORAGE DEVICE

BACKGROUND OF THE INVENTION

The present invention relates to data storage devices, and more particularly, to techniques for storing shingle blocks in a cache memory using a data storage device.

Examples of hard disk drives that write data in overlapping tracks are described in U.S. Pat. No. 6,967,810, to Kasiraj et al., and in U.S. Pat. No. 6,185,063, to Cameron.

BRIEF SUMMARY OF THE INVENTION

According to some embodiments, a data storage apparatus includes a data storage medium, a write element, a non-volatile cache memory circuit, and a controller circuit. The controller circuit is configured to record data on the data storage medium in groups of overlapping tracks using the write element. The controller circuit is configured to store a shingle block of data from a subset of the overlapping tracks in the non-volatile cache memory circuit, while at least a portion of the data in the shingle block of data is updated.

Various objects, features, and advantages of the present invention will become apparent upon consideration of the following detailed description and the accompanying drawings.

DETAILED DESCRIPTION OF THE INVENTION

Figure 1:
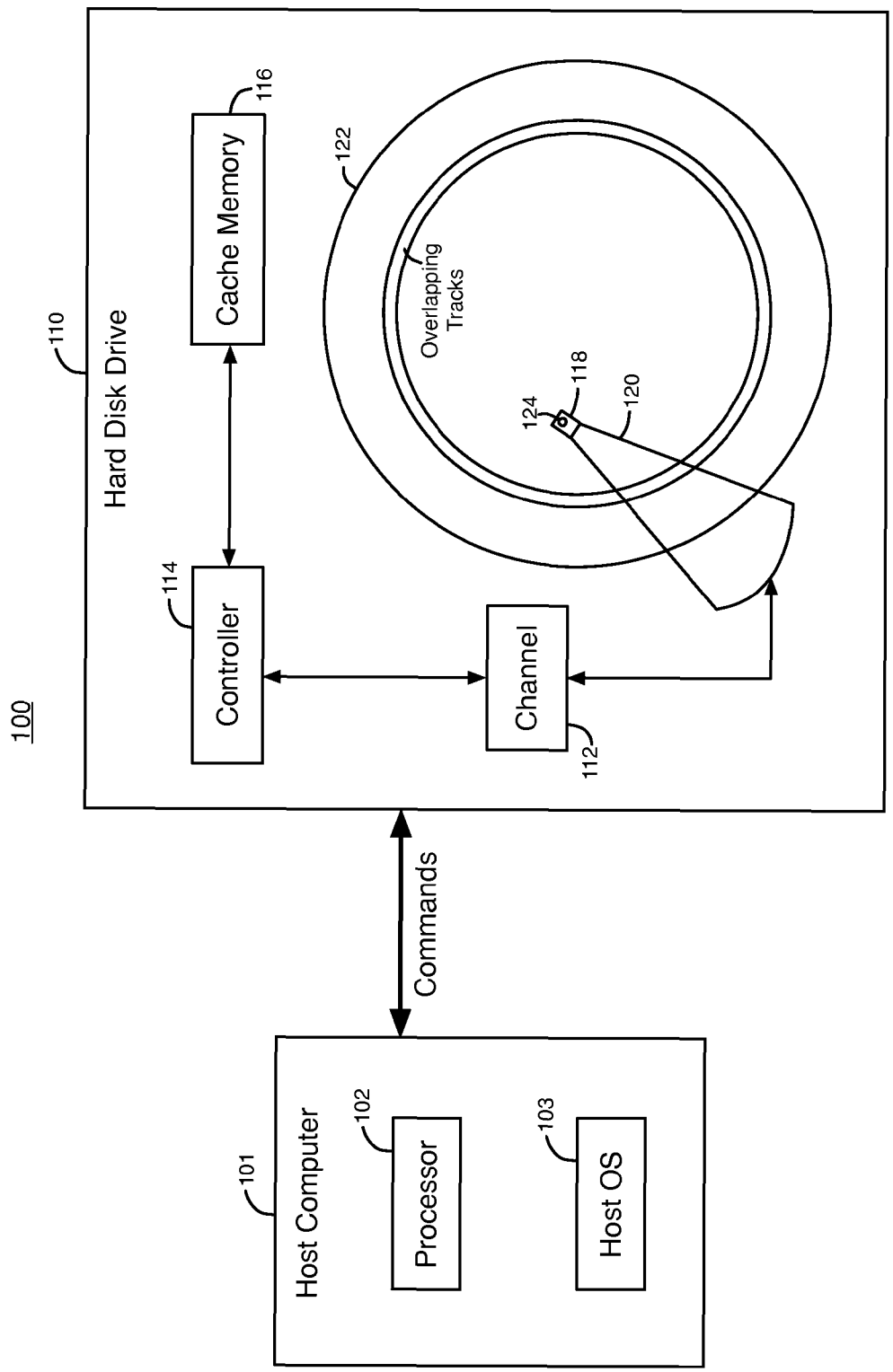
FIG. 1 is a block diagram of a system that includes a host computer and a hard disk drive, according to an embodiment of the present invention.

FIG. 1 is a block diagram that illustrates a system 100, according to an embodiment of the present invention. System 100 includes a host computer 101. Host computer 101 includes a processor chip 102 and a host operating system (OS) 103. System 100 also includes a hard disk drive 110. Hard disk drive 110 includes a magnetic hard disk 122, a channel 112, a controller circuit 114, a cache memory circuit 116, a read/write head 118, and an arm 120 that is attached to an actuator. For ease of illustration, only these elements are shown. Hard disk drive 110 may also include other components such as a spindle motor, etc.

Controller circuit 114 can be fabricated on one or multiple integrated circuit dies. Host computer 101 may be a digital video recorder (DVR), set-top-box (STB), or any other type of computer system, such as an embedded system, a minimalistic system, hand-held device or computer, etc. While the controller circuit 114 is shown residing on the hard disk drive 110, controller circuit 114 may reside in any suitable location, separate from hard disk drive 110 (e.g., on host 101, etc.).

In operation, host operating system 103 in host computer 101 sends commands to hard disk drive 110. In response to the commands, hard disk drive 110 performs requested functions such as reading data, writing data, erasing data, etc. on disk 122 and other disk platters in hard disk drive 110. Read/write head 118 is located on the end of arm 120. Read/write head 118 includes a write element 124 that writes magnetic patterns of data in concentric circular tracks on a writable surface of disk 122. According to some embodiments of the present invention, controller circuit 114 causes write element 124 to record magnetic patterns of data on a writable surface of disk 122 in overlapping circular tracks using a shingled writing technique.

A hard disk drive can use shingled writing principles to write data onto magnetically writable surfaces of one or more hard disks. Adjacent tracks that are written onto a magnetic hard disk using shingled writing principles overlap each other on the writable surface of the hard disk. By overlapping tracks of data, typically much higher track density can be achieved, for example, up to two times compared to conventional recording. However, a track of data stored on the writable surface of a magnetic hard disk using shingled writing principles cannot be overwritten without erasing data stored on other tracks that overlay the track to be overwritten.

Figure 2:
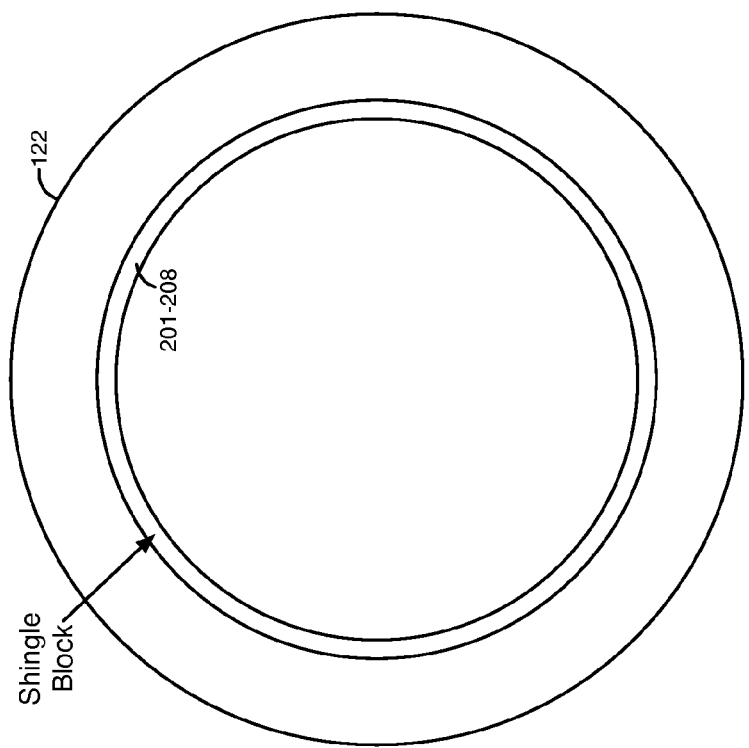
FIG. 2 illustrates an example of 8 concentric circular magnetic tracks of data on a hard disk that were written by a write element in a hard disk drive using shingled recording, according to an embodiment of the present invention.
Figure 2:
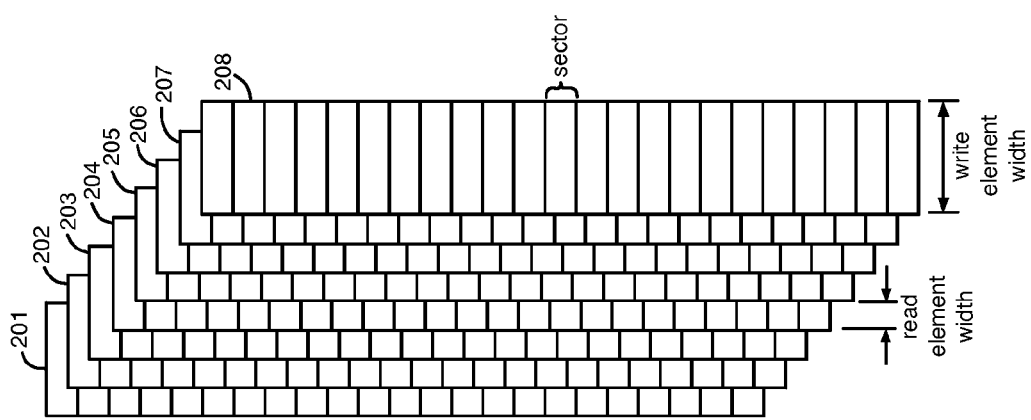

FIG. 2 illustrates an example of 8 concentric circular overlapping magnetic tracks 201-208 of data on a hard disk 122 that were written by a write element in a hard disk drive using shingled recording, according to an embodiment of the present invention. In FIG. 2, a first data track 201 is overlapped by a second data track 202 that is immediately adjacent (i.e., contiguous) to the first data track 201, just to the inside of the first track 201, when data is written to the second data track 202. In turn, when data is written to a third data track 203 that is contiguous to the second data track 202, the third track 203 overlaps a portion of the second data track 202. Similarly, when data is written to a fourth data track 204 that is contiguous to the third data track 203, the fourth track 204 overlaps a portion of the third data track 203.

When data is written to a fifth data track 205 that is contiguous to the fourth data track 204, the fifth track 205 overlaps a portion of the fourth data track 204. When data is written to a sixth data track 206 that is contiguous to the fifth data track 205, the sixth track 206 overlaps a portion of the fifth data track 205. When data is written to a seventh data track 207 that is contiguous to the sixth data track 206, the seventh track 207 overlaps a portion of the sixth data track 206. When data is written to an eighth data track 208 that is contiguous to the seventh data track 207, the eighth track 208 overlaps a portion of the seventh data track 207. Tracks 201-208 overlap like roof shingles.

If the eighth track 208 is the last track in a group of overlapping tracks, track 208 is not overlapped by any other track. The pattern of overlapping may be reversed, i.e., the first track 201 might overlay, instead of underlay, the second track 202, and so on. While only 8 data tracks are shown for clarity of disclosure, a magnetic disk can contain many more data tracks. Each of the tracks 201-208 contains several sectors. Each sector contains several bytes of data. An example of a sector is identified on track 208 in FIG. 2.

The data stored in tracks 201-208 can be read from the disk in a random non-sequential access manner. However, once tracks 201-208 have been recorded on a writable disk surface, any one or more of tracks 201-207 cannot be overwritten without also erasing the data stored in one or more of the tracks 202-208 that were written after the track or tracks being overwritten. For example, if the data in track 203 is overwritten, the data stored in the overlapping tracks 204-206 is erased and must be rewritten or overwritten with new data. Overwriting track 206 erases the data in tracks 207-208. Therefore, tracks 207-208 must also be rewritten with old data or overwritten with updated data. The data stored in tracks 201-202 is still readable by the read element after tracks 203-208 have been overwritten. Preferably, the data stored in tracks 201-208 is recorded in a sequential manner in order to prevent overwriting adjacent tracks.

Hard disk drive 110 includes read/write head 118 positioned at the end of arm 120. Read/write head 118 includes a read element and write element 124. Write element 124 records magnetic patterns of data on the writable surfaces of one or more hard disks in the hard disk drive 110. The read element reads the magnetic data patterns from the writable surfaces of the one or more hard disks. As shown in FIG. 2, the width of the write element is larger than the track pitch. The track pitch is essentially the non-overlapped portion of the width of a data track. For example, the write element can be 3 times wider than the read element. The width of the read element is slightly less than the track pitch, so that the read element is sufficiently narrow to read data from only one single trimmed track at one time. With the relatively wide write element width and physical thickness, the write element can generate larger magnetic fields at the disk, allowing disk coercivities to increase, grain sizes to decrease, and resulting in increased overall recording density.

An example of a hard disk drive that writes data in overlapping tracks is described in U.S. Pat. No. 6,967,810, to Kasiraj et al., issued Nov. 22, 2005, which is incorporated by reference herein in its entirety. Another example of a hard disk drive that writes data in overlapping tracks is described in U.S. Pat. No. 6,185,063, to Cameron, issued Feb. 6, 2001, which is incorporated by reference herein in its entirety.

Figure 3:
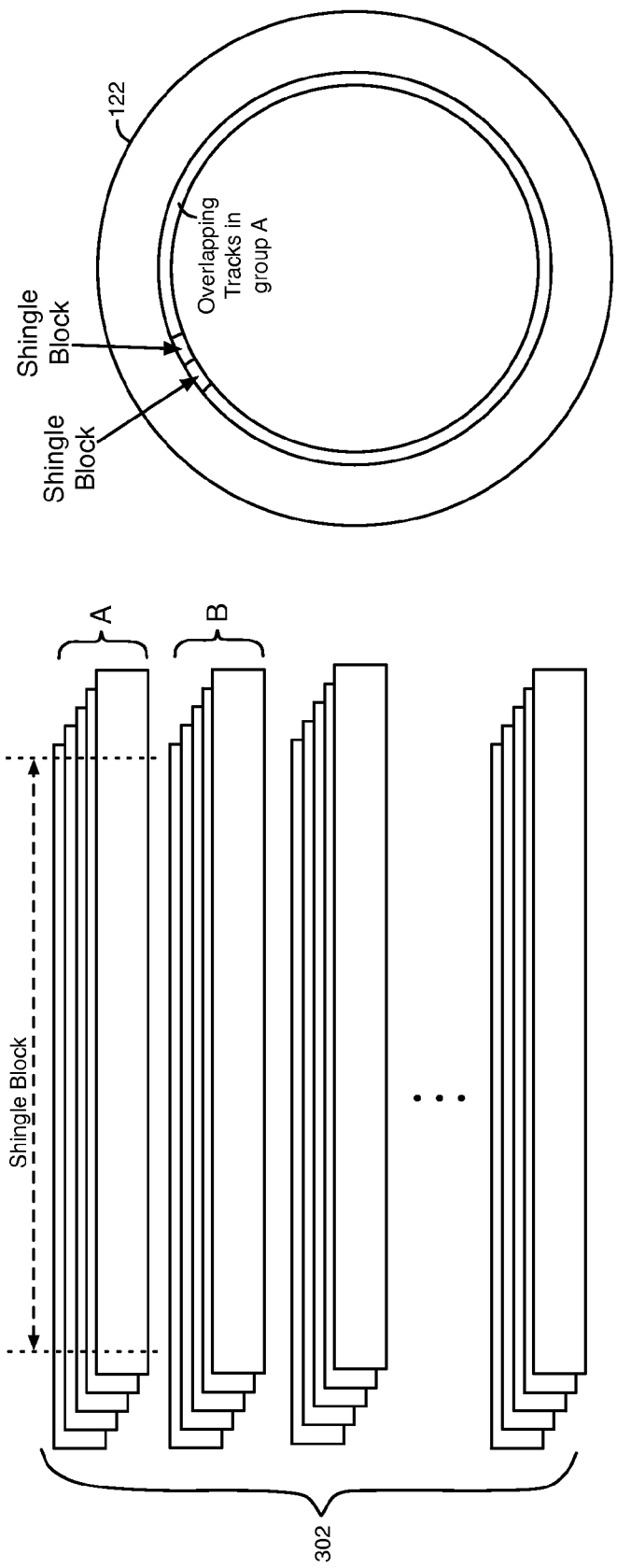
FIG. 3 illustrates an example of a technique for recording overlapping data tracks on a hard disk, according to an embodiment of the present invention.

FIG. 3 illustrates an example of a technique for recording overlapping data tracks on a hard disk in a hard disk drive, according to an embodiment of the present invention. In the example of FIG. 3, hard disk drive 110 records data as magnetic patterns onto hard disk 122 in shingled overlapping concentric circular tracks 302.

Tracks 302 are overlapping tracks that are recorded onto the writable surface of hard disk 122 using a shingled writing technique. Tracks 302 have a much larger recording density than non-overlapping tracks, because tracks 302 overlap adjacent tracks. Tracks 302 preferably occupy most or all of the writable surface area of the hard disk to increase the data density of the hard disk. Hard disk drive 110 can read the data stored in tracks 302 randomly.

In the example shown in FIG. 3, tracks 302 are grouped into sets of 5 tracks. Each group has 5 tracks in the example of FIG. 3, although any suitable number of tracks can be placed into a group. The 5 tracks in each group overlap adjacent tracks within that particular group of tracks, because they are recorded using shingled writing. The tracks in each group do not overlap tracks in any of the other groups, as shown in FIG. 3. For example, the tracks in group A do not overlap the tracks in group B.

Overwriting any of the first four tracks in a group also erases data in the other tracks in that group that were written after the overwritten track. For example, overwriting data in the third track erases data in the fourth and fifth tracks. The data stored in the first and the second tracks is still readable by the read element after the third, fourth, and fifth tracks have been overwritten, because the width of the read element is much less than the width of the write element. Overwriting one or more tracks in one group of tracks does not affect the data in any of the other groups of tracks on the disk. Each group of tracks may, for example, comprise a single data file. The entire file can be written and overwritten to reflect updated data without affecting data in the adjacent groups of tracks.

According to some embodiments of the present invention, a group of overlapping tracks on hard disk 122 are treated as one or more shingle blocks. Each group of overlapping tracks 302 may contain multiple shingle blocks of data. Each of the shingle blocks includes sectors stored in a group of overlapping tracks. For example, the 5 tracks in group A can store several shingle blocks of data, and each shingle block of data includes several sectors from each of the 5 tracks in group A. An example of one shingle block of data in group A is shown in FIG. 3. This example of a shingle block includes data from only a portion of the circumference of each of the 5 tracks in group A, as shown on disk 122 in FIG. 3.

The data in each shingle block may be stored in overlapping portions of the circumferences of the tracks in the group. In an embodiment, tracks 302 in group A shown in FIG. 3 contain several shingle blocks of data. Each shingle block includes data stored in a portion of each of the 5 overlapping tracks in group A. Each of the shingle blocks contains multiple sectors in each of the 5 tracks in group A. Each of the sectors contains multiple bytes of data.

In another embodiment, one shingle block includes data stored in the entire circumferences of multiple overlapping tracks in a group stored on hard disk 122. For example, all of the data stored in the entire circumferences of the 8 data tracks 201-208 can be treated as a single shingle block, as shown, for example, on disk 122 in FIG. 2. As another example, one shingle block of data may include the data stored in the entire circumferences of all of the 5 tracks in group B of overlapping tracks 302.

When hard disk drive 110 overwrites a portion of the data stored in a shingle block of overlapping tracks with updated data, hard disk drive 110 overwrites the tracks being updated and the tracks in that shingle block that were written after the tracks being updated. For example, if hard disk drive 110 is instructed to overwrite a shingle block in group A shown in FIG. 3 with updated data, hard disk drive 110 overwrites the tracks being updated in that shingle block and all of the overlapping tracks that were written after the tracks being updated in group A.

Figure 4B:
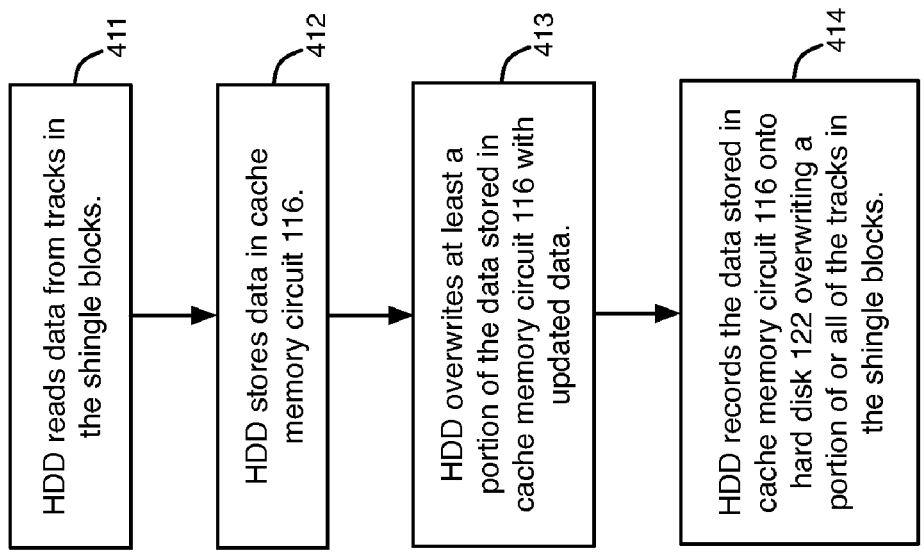
FIG. 4B is a flow chart that illustrates a process for using a cache memory circuit to store multiple shingle blocks while data in the shingle blocks is being updated, according to an embodiment of the present invention.
Figure 4A:
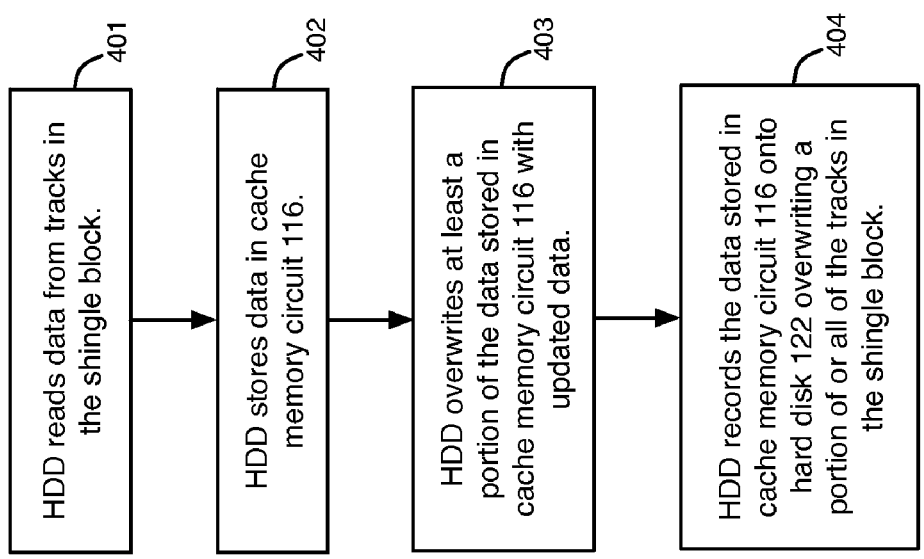
FIG. 4A is a flow chart that illustrates a process for using a cache memory circuit to store a shingle block while data in the shingle block is being updated, according to an embodiment of the present invention.

FIG. 4A is a flow chart that illustrates a process for using a cache memory circuit to store a shingle block while data in the shingle block is being updated, according to an embodiment of the present invention. Initially, hard disk drive (HDD) 110 reads data from tracks in the shingle block being updated and any subsequently written tracks in that same shingle block, in step 401. Hard disk drive 110 then stores that data in semiconductor solid-state cache memory circuit 116, in step 402. For example, if data from track 204 is being updated, hard disk drive 110 reads data from tracks 204-208 and stores that data in cache memory 116.

Hard disk drive 110 then overwrites at least a portion of the data stored in cache memory circuit 116 with the updated data, in step 403. Subsequently, hard disk drive 110 records the data stored in cache memory circuit 116 onto hard disk 122 overwriting a portion of or all of the tracks in the shingle block, in step 404. The shingle block now contains the updated data. For example, if only track 204 is being updated, hard disk drive 110 overwrites tracks 204-208 with the updated data and the old data stored in cache memory 116.

If hard disk drive 110 stores the data in volatile memory, instead of non-volatile memory, during the rewriting process, and hard disk drive 110 loses power while the data is stored in the volatile memory, some or all of the data may be lost irretrievably. According to an embodiment of the present invention, cache memory circuit 116 is a non-volatile semiconductor solid-state memory circuit. For example, cache memory 116 can be Flash or EEPROM memory. Cache memory 116 can be, for example, NAND or NOR flash memory. Because cache memory circuit 116 is a non-volatile memory circuit, hard disk drive 110 retains the data stored in cache memory circuit 116, while a shingle block of data on disk 122 is being updated.

Cache memory 116 contains at least as much memory storage capacity as a single shingle block of data. In one embodiment, cache memory 116 has enough memory storage capacity to store only a single shingle block of data. In other embodiments, cache memory 116 has a memory storage capacity that equals a multiple of a single shingle block of data. For example, cache memory 116 can contain two times, three times, four times, five times, etc. the storage capacity of a single shingle block of data for storing 2, 3, 4, 5, etc. shingle blocks of data at one time.

A single shingle block can include data stored in portions of the circumferences of multiple overlapping tracks in a group or data stored in the entire circumferences of multiple overlapping tracks in a group, such as tracks 201-208. According to various embodiments, cache memory 116 has enough storage capacity to store the data from one shingle block or from multiple shingle blocks. Thus, the memory capacity of cache memory 116 is selected based on a selected shingle block size and the number of shingle blocks that cache memory 116 is expected to store at one time.

If cache memory 116 has enough memory to store multiple shingle blocks, hard disk drive 110 can update data in multiple shingle blocks at the same time using cache memory 116 as follows. FIG. 4B is a flow chart that illustrates a process for using a cache memory circuit to store multiple shingle blocks while data in the shingle blocks is being updated, according to an embodiment of the present invention. Initially, hard disk drive 110 reads data from tracks in the shingle blocks being updated and any subsequently written tracks in those same single blocks, in step 411. Hard disk drive 110 then stores that data in semiconductor solid-state cache memory circuit 116, in step 412. Hard disk drive 110 overwrites at least a portion of the data stored in cache memory circuit 116 with the updated data, in step 413. Subsequently, hard disk drive 110 records the data stored in cache memory circuit 116 onto hard disk 122 overwriting a portion of or all of the tracks in the shingle blocks, in step 414. The shingle blocks now contain the updated data.

Cache memory 116 can be used for read-cache or for write-cache functions. In response to receiving a write request and one or more shingle blocks of data from host computer 101, hard disk drive 110 can store the one or more shingle blocks of data in cache memory 116 before the one or more shingle blocks of data are recorded on disk 122. In response to receiving a read request from host computer 101, hard disk drive 110 can store one or more shingle blocks of data in cache memory 116 after the one or more shingle blocks of data are read from disk 122 and before the one or more shingle blocks are transmitted to host computer 101. Data is transmitted between disk 122 and cache memory 116 through read/write head 118, arm 120, channel 112, and controller circuit 114.

A journaling file system is a file system that logs changes to the file system in a journal before storing the changes in the main file system. According to another embodiment, non-volatile cache memory circuit 116 is used as a journal to store changes to the file system to implement a journaling function. If a power failure or system crash of hard disk drive 110 occurs while changes are being made to the file system, the data stored in hard disk drive 110 is less likely to become corrupted, because the changes are stored in non-volatile cache memory circuit 116 during the process of updating the file system. Hard disk drive 110 can store data and i-nodes in non-volatile cache memory circuit 116 during changes to a journaling file system. An i-node stores basic information about a regular file, directory, or other file system object. I-nodes store information on files, such as user and group ownership, access mode (read, write, execute permissions) and type of file.

Embodiments of the present invention can, for example, be implemented using one or a combination of hardware, software, and a computer-readable medium containing program instructions. Embodiments of the present invention can be embodied as program code stored on a computer readable medium that can be run on a computer. Software implemented by embodiments of the present invention and results of the present invention can be stored on a computer-readable medium such as semiconductor memory, hard disk drive, compact disc (CD), digital video disc (DVD), or other media. Results of the present invention can be used for various purposes such as being executed or processed by a processor, being displayed to a user, transmitted in a signal over a network, etc. Embodiments of the present invention may also be embodied as a computer readable program code unit stored on a computer readable medium, for causing a number of computer systems connected via a network to affect distributed processing.

The foregoing description of the exemplary embodiments of the present invention has been presented for the purposes of illustration and description. It is not intended to be exhaustive or to limit the present invention to the examples disclosed herein. In some instances, features of the present invention can be employed without a corresponding use of other features as set forth. Many modifications, changes, and variations are possible in light of the above teachings, without departing from the scope of the present invention. It is not intended that the scope of the present invention be limited with this detailed description.

What is claimed is:

1. A data storage apparatus comprising:
   at least one data storage medium;
   at least one write element;
   at least one non-volatile cache memory circuit; and
   at least one controller circuit configured to record data on the data storage medium in groups of overlapping tracks using the write element,
   wherein a shingle block of data only includes data stored in a portion of each track in a set of overlapping tracks on the data storage medium, and wherein the controller circuit is configured to store the shingle block of data from the portion of each track in the set of the overlapping tracks in the non-volatile cache memory circuit while at least a portion of the data is updated.

2. The data storage apparatus defined in claim 1 wherein the data storage apparatus updates the shingle block of data in the non-volatile cache memory circuit to generate updated data stored in the non-volatile cache memory circuit.

3. The data storage apparatus defined in claim 1 wherein the controller circuit is configured to store multiple shingle blocks of data from a subset of the overlapping tracks in the non-volatile cache memory circuit at the same time while at least a portion of the data in the shingle blocks is updated.

4. The data storage apparatus defined in claim 1 wherein the controller circuit treats data stored in a group of the overlapping tracks on the data storage medium as a shingle block of data, and the controller circuit is configured to store the shingle block of data from the group of the overlapping tracks in the non-volatile cache memory circuit every time that a portion of the shingle block of data is updated.

5. The data storage apparatus defined in claim 1 wherein the controller circuit is configured to record data on the data storage medium in groups of overlapping tracks such that the overlapping tracks in each of the groups do not overlap tracks in any of the other groups of overlapping tracks on the data storage medium.

6. The data storage apparatus defined in claim 1 wherein the non-volatile cache memory circuit is a non-volatile flash memory circuit.

7. The data storage apparatus defined in claim 1 wherein the data storage device is a hard disk drive apparatus.

8. A data storage apparatus comprising a data storage medium, a control circuit, a non-volatile cache memory circuit, and code stored on a computer readable medium, wherein the code comprises:
   code for writing data on the data storage medium in groups of overlapping tracks using a write element;
   code for storing a shingle block of data from a subset of the overlapping tracks in the non-volatile cache memory circuit while at least a portion of the data in the shingle block of data is updated to generate updated data stored in the non-volatile cache memory circuit; and
   code for writing the updated data in the subset of the overlapping tracks on the data storage medium.

9. The data storage apparatus defined in claim 8 wherein the shingle block of data only includes data stored in a portion of each track in a set of overlapping tracks on the data storage medium, and wherein the code for storing the shingle block of data further comprises code for storing the data from the portion of each track in the set of overlapping tracks in the non-volatile cache memory circuit while at least a portion of the data is updated to generate the updated data.

10. The data storage apparatus defined in claim 8 wherein the code for storing the shingle block of data further comprises code for storing multiple shingle blocks of data from a subset of the overlapping tracks in the non-volatile cache memory circuit at the same time while at least a portion of the data in the multiple shingle blocks is updated to generate the updated data.

11. The data storage apparatus defined in claim 8 wherein the code for storing the shingle block of data further comprises code for storing at least three shingle blocks of data from a subset of the overlapping tracks in the non-volatile cache memory circuit at the same time while at least a portion of the data in the three shingle blocks is updated to generate the updated data.

12. The data storage apparatus defined in claim 8 wherein the code for storing the shingle block of data further comprises code for storing a shingle block of data from a subset of the overlapping tracks in the non-volatile cache memory circuit while at least a portion of the data in the shingle block of data is updated such that the shingle block of data comprises data from at least three overlapping tracks.

13. The data storage apparatus defined in claim 8 wherein the code for writing data on the data storage medium in groups of overlapping tracks using the write element further comprises code for writing data on the data storage medium in groups of overlapping tracks such that the overlapping tracks in each of the groups do not overlap tracks in any of the other groups of overlapping tracks on the data storage medium.

14. The data storage apparatus defined in claim 8 wherein the code for storing the shingle block of data further comprises code for storing data from first overlapping tracks that are being updated in the non-volatile cache memory circuit and storing data from second overlapping tracks that was recorded after the data from the first overlapping tracks was recorded in the non-volatile cache memory circuit.

15. A method for storing data on a data storage medium using a data storage device that comprises a non-volatile cache memory circuit, wherein the method comprises:
   writing data on the data storage medium in groups of overlapping tracks using a write element;
   storing a shingle block of data from a subset of the overlapping tracks in the non-volatile cache memory circuit while at least a portion of the data in the shingle block of data is updated to generate updated data stored in the non-volatile cache memory circuit; and
   writing the updated data in the subset of the overlapping tracks on the data storage medium.

16. The method defined in claim 15 wherein storing the shingle block of data further comprises storing multiple shingle blocks of data from a subset of the overlapping tracks in the non-volatile cache memory circuit at the same time while at least a portion of the data in the multiple shingle blocks is updated to generate the updated data.

* * * * *